Aug. 20, 1963

E. S. WELCH ETAL 3,101,435

PROGRAM CONTROLLER

Filed Oct. 9, 1959

INVENTORS
ELMER S. WELCH
JAMES S. ROBERTS
BY
Lieber, Lieber & Nilles
ATTORNEYS

INVENTORS
ELMER S. WELCH
JAMES S. ROBERTS
BY

Lieber, Lieber &Nilles
ATTORNEYS

INVENTORS
ELMER S. WELCH
JAMES S. ROBERTS
BY Lieber, Lieber & Nilles
ATTORNEYS

United States Patent Office 3,101,435
Patented Aug. 20, 1963

3,101,435
PROGRAM CONTROLLER
Elmer S. Welch, Thiensville, and James S. Roberts, Milwaukee, Wis., assignors, by mesne assignments, to Milwaukee Chaplet & Mfg. Company, Inc., Milwaukee, Wis., a corporation of Wisconsin
Filed Oct. 9, 1959, Ser. No. 845,480
12 Claims. (Cl. 318—162)

The present invention relates to an automatic program controller of the rotatable control drum type, the positioning of the drum being itself electrically controlled in accordance with the positioning and arrangement of switch actuating pins located on its periphery.

The present invention provides an improved controller of the above type in which the drum is rotated intermittently in a step-by-step manner and during the very brief interval of pause between steps all of the appropriate and selected switches for the various functions and programs are operated positively and simultaneously.

A more specific aspect of the present invention provides a controller of the above type having a positive and quickly responsive drive, including an electric motor for the drum, which motor is electrically controlled in accordance with control elements located on the drum surface. In the latter respect, different portions of the drum are utilized for various programs to be carried out and the selection of these programs is instantly made by a selector switch.

Complete flexibility of programming is provided by the present invention, not only as to the number or sequence of programs or the individual operations of each program, but furthermore flexibility as to the time intervals of these programs and functions thereof is provided.

Another object of the present invention is to provide a program controller of the perforated drum type which has a plurality of improved switch actuating pins which can be used for both roller and probe types of switches. In addition, these pins form an accurate track for the shiftable switch elements, are easily inserted firmly in position in the drum perforations, and cannot be installed in an incorrect position.

Other objects and advantages of the present invention, such as inter alia, quick return characteristics, no resetting required, ease of program set-up, accurately formed program "tracks," all will appear later as this disclosure progresses, reference being had to the accompanying drawing in which:

FIGURE 3 is a vertical sectional view, taken generally along line 3—3 in FIGURE 2, but on a reduced scale;

FIGURE 4 is a vertical sectional view taken along line 4—4 in FIGURE 2 and showing one of the limit switches which contact the removable actuating pins;

FIGURE 5 is a view similar to FIGURE 4, but taken along line 5—5 in FIGURE 2, and showing the limit switch for controlling the "stepping" of the drum.

FIGURE 6 is an enlarged perspective view of one of the removable pins, and

Figure 1:
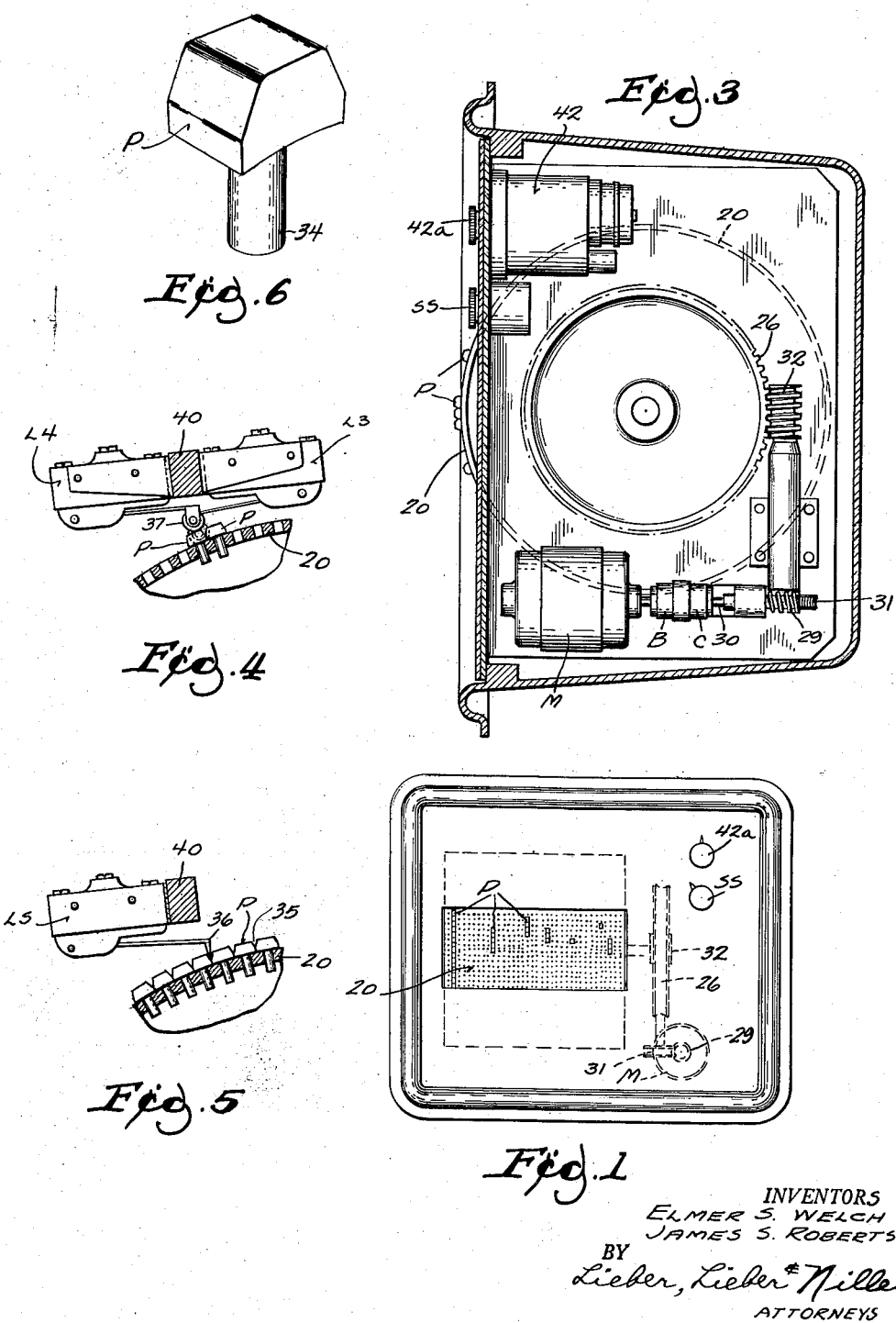
FIGURE 1 is a front elevational view of a controller made in accordance with the present invention.

The present program controller system includes a control drum having a perforated periphery in which switch actuating pins are easily positionable to establish a plurality of programs operative in the desired sequence; a mechanical drive for quickly and positively starting and stopping rotation of the drum; a step switch or "probe" for controlling the amount of drum movement as determined by the "step" pins which it contacts; a manually settable interval timer for fixing the length of time represented by any one "step" pin; a limit switch for establishing the "home" position of the drum; a series of limit switches contactable by the drum pins for carrying out a program or sequence of various functions; a selector switch for determining which program is to be followed and a series of "load" limit switches for causing operation of the various functions of a program.

Control Drum and Drive

The drum 20 is rotated by the motor M through the mechanical drive which includes a normally engaged brake B, clutch C, worm 29 on shaft 30, gear 31 which is suitably mounted in the housing, and worm 32 which meshes with large gear 26.

The mechanical drive connection to be described has been shown as an example of one type that is useable with this invention and for purposes of illustration only. This drive includes the electric motor M which stops and starts rotation of the control drum through the clutch C and brake B. The arrangement is such, as will more fully appear hereinafter, that when the clutch is disengaged and the brake is simultaneously engaged, the drum will immediately cease rotating. Conversely, simultaneously disengaging the brake and engaging the clutch will cause the drum to rotate. The means for actuating the brake and clutch will be later described, and this particular drive for the drum utilizes a continuously running motor, and a rapid rotational movement is imparted to the drum to move it from one position to the next. Other drives could be utilized, such as for example, a dynamically braked electric motor which is stopped and started to drive the drum through a gear train and chain drive. In any event, the drum is moved in a very positive and quick manner for fast response characteristics, which movement in a "step-by-step" manner permits simultaneous actuation of any of the previously selected limit switches which may be in alignment on the drum.

The drum is perforated by a series of rows of apertures or perforations which extend around its periphery, the rows being axially spaced from one another and totaling about thirty in number. The number of these parallel, spaced and circumferential rows may of course be variable. As shown for illustrative purposes, there are perforations for about 120 pins around the circumference of the drum in each row, although of course, this number may vary also. It should be noted that the apertures are also aligned axially on the drum in transverse rows.

Pins

The pins P are of a shape shown clearly in FIGURE 6 and have inclined front and rear sides, in respect to the direction of drum rotation, which pins define a groove 35 between the pins when the latter are positioned next to one another in any one of the circumferential rows of perforations. These pins could alternatively be cut away or inclined only on one of their sides, but by providing both front and rear sides with groove defining surfaces, improper assembly on the drum is precluded because the pins can be turned in either direction and still define groove 35 therebetween. These pins are furthermore square in plan view to thereby bear firmly against their adjacent pin and prevent twisting of the pins in their perforations. The pins include a stem 34 by which they are firmly anchored in any of the drum apertures, yet are easily removed therefrom. As will later appear more fully, the particular shape of these pins forms an accurate switch actuating track and one capable of use with either the probe type of switch shown in FIGURE 5 used for "stepping" of the drum, or the roller containing type of switch used for the program and load limit switches.

Limit Switches

The limit switches LH, LS and L1 to L30, inclusive are of the two-position type and some have been shown as of the normally open type and are conventional in that they have an arm swingably mounted thereon for switching to on or off positions. The "stepping" switch LS has a pointer 36 secured to its free end which is adapted to drop into groove 35 between the pins to open the line containing it. The other limit switches each have a roller 37 on the free end of its arm, which roller rides smoothly over the pins in the switch closed position, or on the drum periphery, in the absence of pins, in the switch open position.

As shown in the drawings for illustrating one use of the invention, the single switch LH is the "home" switch, switches L1 to L4 are the "program" switches which each represent a separate program. Switches L5 to L30 are the "load" switches and are connected with their respective actuating mechanisms 39 which may consist of solenoid valves, relays, or the like, which in turn control various functions of the program. Some of these functions have been labelled in FIG. 7 as examples only of the type of functions which may be performed. These switches are all mounted on the support bar 40, their rollers 37 and the pointer 36 all being in axial alignment across the width of the drum.

Interval Timer

Figure 2:
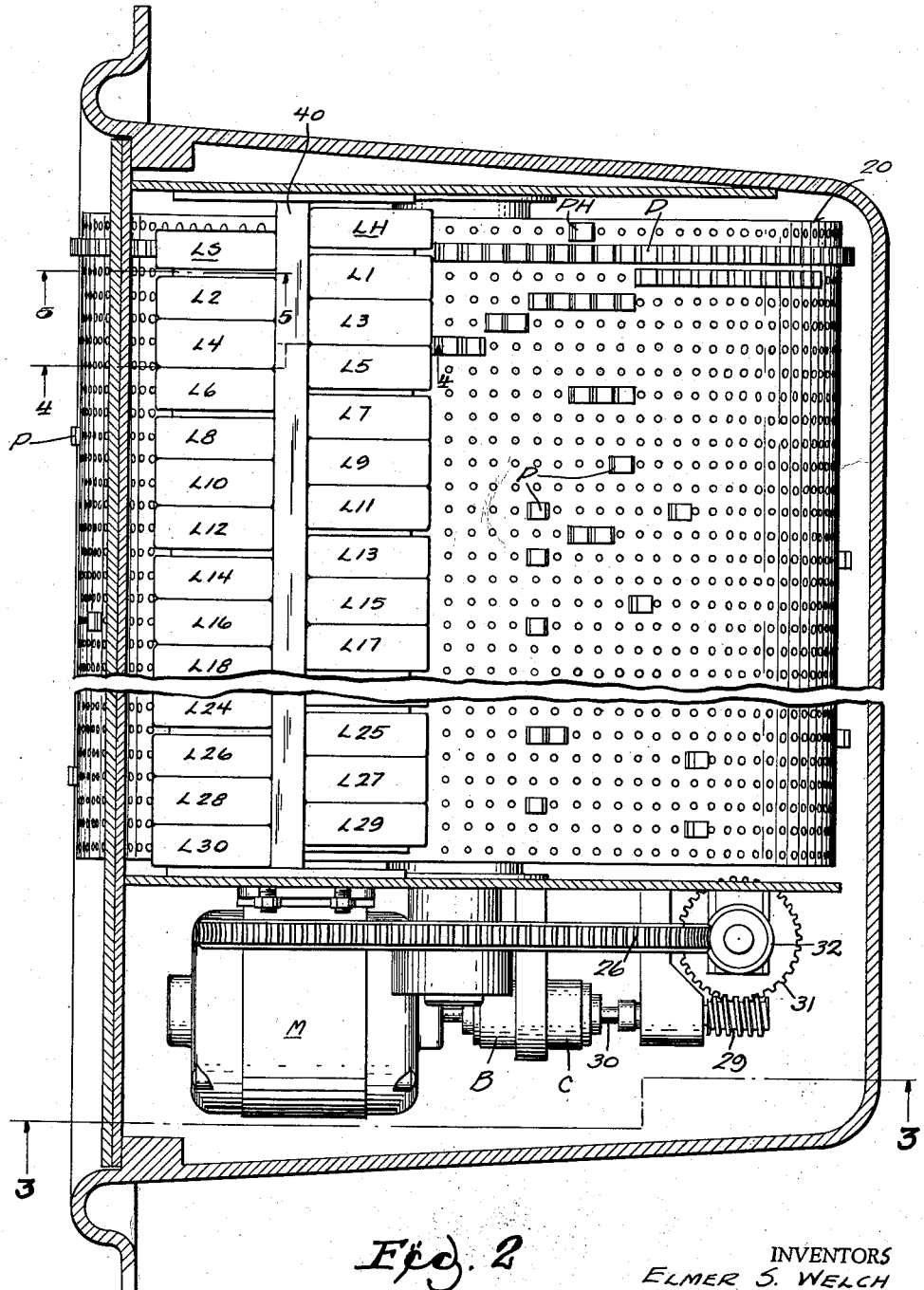
FIGURE 2 is a plan view in section of the FIGURE 1 controller with its various limit switches and the drum driving means all located in their housing.
Figure 7:
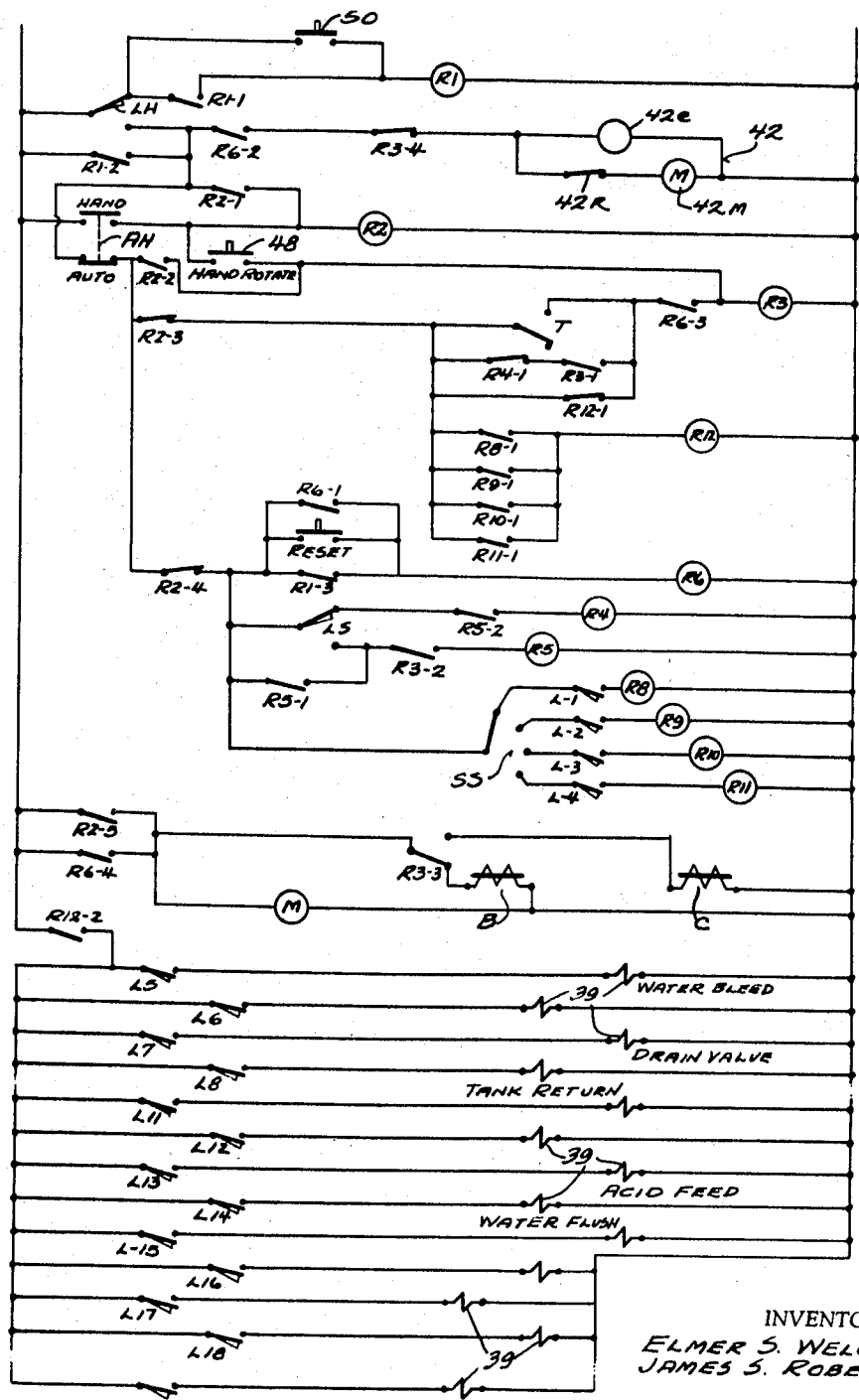
FIGURE 7 is an electrical circuit showing one application of use for the present invention.

An interval timer 42 (FIGURES 3 and 7), having a manually adjustable knob 42a is provided for determining the increment of time represented by each of the pins P located in the "stepping" row, which row is shown in FIGURE 2 as the one second from the top of the cylinder and is located directly beneath the switch LS in an axial direction. As shown in FIGURE 7, this conventional timer includes a clutch 42e, a motor 42m and a relay 42r and also a load relay T. The interval of time represented by each pin P in the stepping row is thus predetermined by the position of the manually adjustable knob 42a, and this interval is adjustable but remains constant for any cycle of operation.

Selector Switch

A manually operable selector switch SS (FIGURES 3 and 7) is provided for preselecting the program to be followed by selecting any one of the program switches L1 to L4 for inclusion in the circuit.

General

The drum carries a pin PH at its extreme left end, which pin is adapted to be contacted by the home switch LH for actuating the latter. Pin PH designates the "home" position or starting position of the drum and is the only pin which actuates switch LH. As shown in FIGURE 7, this switch is in the activated or "home" position on pin PH.

The above arrangement is such, as will presently appear, that whenever pins are inserted in the "stepping row" (under switch LS) an interval of time of drum rotation is provided, the length of which time is determined by the interval timer 42, provided that a corresponding selected program has been established by pins in the other rows, that is to say, provided other pins are present in the selected program row or rows in axial alignment with the pin in the "stepping" row. Stated otherwise, whenever a pin on the selected program or programs is in axial alignment with the pin on the stepping row under its switch, all of the functions will be brought into operation.

FIG. 7 Circuit

For the purpose of more clearly illustrating the invention, it will be described particularly in connection with FIGURE 7 which shows a typical electrical circuit usable therewith.

In this figure conventional symbols have been used, for example, when a switch is shown as located beneath its line it is of the normally open type, and where it is located above its line it is a normally closed switch.

The general purpose of the various relays are as follows: R1 is a "start" relay—it provides power to the system until the drum moves sufficiently to clear the home switch LH; R2 is energized when the hand rotate button 48 is manually depressed. Rotation of the drum occurs as long as this button is depressed. It is used for set-up purposes, that is, for setting up the pins in the drum; R3 controls the power supply to the interval timer and also to the brake and clutch—it operates as a part of the circuitry at the end of a timing interval; R4 and R5 together with R3 provide a "stepping" sequence to be described; R6 is engaged throughout a cycle and is disengaged when the drum "homes out" on the completion of a cycle; R8 to R11 provide for setting up selected programs through a common selector switch; and R12 when disengaged causes continuous rotation of the drum by continuous engagement of R3, R3 being held in by the contact R12–1 of relay R12. When R12 is engaged by the axial alignment of a limit switch with a selected program, R12 then interrupts the circuit to R3 (via R12–1) and R12–2 activates the desired load limit switches L5 to L30.

A more detailed description of the operation of this circuit is as follows. Assume the selector switch SS has been manually turned to a desired and known program, say program 2 which is selected through limit switch L–2. Assume further that the manual switch AH which selects either an automatic or hand operation of the drum, is at "automatic." The operator pushes the "start" button 50 which closes the normally open relay contact R1–1, and also the contact R1–2 which transmits power to the timer clutch and also brings power to R1–3 to engage the latter and thus engage relay R6. Relay R3 then simultaneously disengages the interval timer motor 47m, disengages the brake B and engages the clutch C, causing the drum to rotate continuously until the circuit to relay R3 is interrupted. Relay R6 is thus energized and the drum clears the "home" pin PH. The drum then moves past or ignores the pins in the program number one row located under program switch L–1 and during this time controls are not activated. Generally, then when program switch L–2 contacts the first pins in its row, the drum stops and the interval timer starts. The timer runs for a period of time as set by its dial 42a and then the drum moves over the next pin and again stops for a period determined by the timer. This operation is repeated as often as a pin in the selected program row is axially aligned with a pin in the stepping row under switch LS. More specifically, when switch L–2 is activated by the pin in its row, the relay R9 is engaged and the latter's contact R9–1 engages relay R12. This breaks contact R12–1 which interrupts current to relay R3, causing the latter to drop out, disengaging the clutch and engaging the brake. This immediately stops rotation of the drum and simultaneously starts the interval timer.

The engagement of R12 also simultaneously activates all other circuits, through their limit switches, to provide current to these switches for operation of all aligned functions.

The interval timer runs for its selected period at the end of which a relay T, which is the load relay on the timer, switches from the lower to the upper position (as viewed in FIG. 7). This then engages relay R3 which simultaneously disengages contact R3–4 (and also all other contacts of R3) which interrupts current to the timing motor 42m and the timing relay 42r and allows the timer to reset; at the same time R3–1 is engaged to complete a circuit through relay R4–1 so that R3 will be held engaged notwithstanding that the timer resets and allows the timer relay T to drop.

Furthermore, when relay R3 engages, it moves its contact R3–3 to thereby disengage brakes B and engage clutch C, starting rotation of the drum.

With the engagement of relay R3, its contact R3–2 closes. As the drum starts to rotate, stepping switch LS moves to the disengaged or "free" position (opposite to that shown), and causes relay R5 to be engaged, through contact R3–2; R5 then forms its own holding circuit through its contact R5–1. As the drum continues to rotate, the stepping switch LS is raised by the next pin to close the normally open circuit. Power to switch LS then flows through the closed contact R5–2 to engage relay R4. This opens contact R4–1 to thereby interrupt power to R3, the latter thus dropping out and accomplishing the following: (1) holding contact R3–1 opens, (2) simultaneously R3–2 interrupts power to R5 and drops the latter out, (3) R5–2 then drops R4 out; R3–3 disengages the clutch C and engages brake B to stop rotation of the drum; R3–4 starts interval timer to repeat the cycle as above described.

The above cycle takes approximately 1/10 of a second to perform, and if there are 35 pairs of pins, the pins of each pair being in axial alignment and the program continuing circumferentially for 35 successive pairs of pins, then this will happen 35 times for one program.

At the end of any program, that program relay previously selected would drop out due to the absence of pins at that point and this causes relay R12 to drop out, closing contact R12–1 and causing rotation of the drum, through relay R3, until power is interrupted by the "home" pin PH and thus breaking the normally closed contact of "home" switch LH.

As mentioned earlier, the hand rotate button 48 is for causing manual rotation of the drum. This action takes place whenever the selector switch AH is in the hand position. This is utilized for setting up the drum to permit pins to be inserted at desired points. Relay 2 provides the power to the brake and clutch and interrupts the power to the automatic functions, such as the timer and the cycle-selector. Relay 2 serves another function, in that, once it has been engaged by the selection of the hand position of switch AH, the relay will remain engaged until the drum is returned to the "home" position. Relay 2 being engaged causes the drum to rotate continuously to the "home" position when the switch AH is returned from the hand position to the automatic position. More specifically, the action is as follows. R2–2 and R2–1 are engaged to provide power to R2 when the manual two-position switch AH is put on the "automatic" position. Then contact R2–2 is closed for subsequent use; R2–3 is opened and interrupts power to the interval timer; R2–4 interrupts power to step sequence system; R2–5 provides power to the clutch C and brake B. As mentioned, when the two-position switch AH is set on "automatic," relay R2 is held by its contact R2–1. Contact R2–2 provides continuous power to R3 which causes the drum to rotate until home switch LH is contacted by pin PH to thereby cut off power to relays R2 and R3, thus stopping the drum.

This manually controlled feature for the control drum provides a convenient way for setting up programs on the drum surface.

As an example of the flexibility of use of the above described inventions, instead of having relay R12 engage the load switches L5 to L30, additional contacts could be provided on any of the program relays R8 to R11, which contacts would engage any selected load relays. In this manner sections of a system can be selected for actuation.

The above described units may also be connected together in "slave" fashion to further increase their versatility.

The present invention provides a control drum that is quickly and positively moved from one position to the next. In this connection, an efficient mechanical drive has been provided, the control of which is accomplished electrically as determined by elements on the drum. This is highly important because of the rapidity of operation of the switches, being on the order of 1/60 of a second, and the fact that a complete revolution of the drum may typically take approximately one minute. A wide selection of programs may be arranged in any desirable sequence, the switching of all control impulses being simultaneous, that is, all elements under control are actuated simultaneously.

The time interval can be easily varied without changing any mechanical drives or other parts—a flexible overall time program is provided. The program, regardless of its length, is quickly returned to its starting position without delay.

Not only is highly flexible programming made possible by this invention, but also accurate timing of the functions is insured.

Various modes of carrying out the invention are contemplated as being within the scope of the following claims particularly pointing out and distinctly claiming the subject matter which is regarded as the invention.

What is claimed and desired to be secured by Letters Patent is:

1. A program controller comprising, a rotatable drum having a plurality of spaced, parallel, circumferential rows of perforations concentric with the axis of rotation of the drum, said perforations also being in axial alignment in respect to the axis of drum rotation, a control element for each of said circumferential rows, a plurality of pins insertable in said perforations for actuating said control elements, one circumferential row of pins and its associated control element constituting stepping means for controlling step-by-step rotation of the drum, drive means for rotating said drum and alternately operable to stop and start rotation of said drum, said drive means including an electric motor, said controller having an electrical circuit which includes said control elements and motor, and an interval timer in said circuit for determining the length of time represented by each pin of said stepping means.

2. A program controller comprising, a rotatable drum having a plurality of spaced, parallel, circumferential rows of perforations concentric with the axis of rotation of the drum, said perforations also being in axial alignment in respect to the axis of drum rotation, a control element for each of said circumferential rows, a plurality of pins insertable in said perforations for actuating said control elements, one circumferential row of pins and its associated control element constituting stepping means, drive means for rotating said drum and alternately operable to stop and start rotation of said drum, said drive means including an electric motor, said controller having an electrical circuit which includes said motor and into which circuit other of said control elements are adapted to be selectively switched, and a manually operated selector switch in said circuit for selecting the control elements to be placed in said circuit for actuation by drum rotation.

3. A program controller comprising, a rotatable drum having a plurality of spaced, parallel, circumferential rows of perforations concentric with the axis of rotation of the drum, said perforations also being in axial alignment in respect to the axis of drum rotation, a control element for each of said circumferential rows, a plurality of pins insertable in said perforations for actuating said control elements, one circumferential row of pins and its associated control element constituting stepping means, drive means for rotating said drum and including an electric motor, said drive means being alternately operable respectively to stop and start rotation of said drum, said controller having an electrical circuit which includes said motor and into which circuit the other of said control elements are adapted to be selectively switched, an interval timer in said circuit for determining the length of time represented by each pin of said stepping means, and a selector switch in said circuit for selecting the control elements to be placed in said circuit for actuation by rotation of the drum.

4. A program controller comprising, a rotatable drum having a plurality of spaced, parallel, circumferential rows of perforations concentric with the axis of rotation of the drum, said perforations also being in axial alignment in respect to the axis of drum rotation, a control element for each of said circumferential rows and in axial alignment along said drum, a plurality of pins insertable in said perforations for actuating said control elements, one circumferential row of said pins and its associated control element constituting stepping means, drive means for rotating said drum and including an electric motor, said drive means being alternately operable respectively to stop and start rotation of said drum, said controller having an electrical circuit which includes said motor and is also adapted to include said control elements, and a selector switch in said circuit for manually selecting the control element to be included in said circuit, said stepping means controlling the step-by-step rotation of said drum whereby all selected axially aligned control elements are actuated simultaneously by their respective and axially aligned pins.

5. In a program controller, a rotatable drum having a plurality of spaced, parallel, circumferential rows of perforations, an electrical control circuit, a control element in said circuit for each of said circumferential rows, a plurality of pins insertable in said perforations for actuating said control elements, one circumferential row of pins and its associated control element constituting stepping means for controlling step-by-step rotation of said drum, a continuously running electric motor in said circuit, an electrically operated brake and clutch in said circuit and mechanically driven by said motor to rotate said drum, said brake and clutch being controlled by said stepping means and alternately operable to stop and start rotation of said drum, and an interval timer in said circuit for determining the length of time during which said stepping means control element is operative to stop drum rotation.

6. A device as defined in claim 5 further characterized in that said pins have front and rear surfaces extending radially above said drum of such shape that adjacently positioned pins in a circumferental row define a groove between them, said one control element having a probe adapted to drop into said groove to actuate said element.

7. In a program controller, a rotatable drum having a plurality of spaced, parallel, circumferential rows of perforations concentric with the axis of rotation of the drum, said perforations also being in axial alignment in respect to the axis of drum rotation, an electrical control circuit, a control element in said circuit for each of said circumferential rows, said elements also being axially aligned along the drum, a plurality of pins insertable in said perforations for actuating said control elements, one circumferential row of pins and its associated control element constituting stepping means for controlling step-by-step rotation of said drum, drive means for rotating said drum and including a continuously running electric motor in said circuit and also including an electrically operated brake and clutch in said circuit and driven by said motor, said brake and clutch being alternately operable to stop and start rotation of said drum, and an interval timer in said circuit for determining the length of time during which said stepping means control element is operative to stop drum rotation.

8. In a program controller, a rotatable drum carrying a multiplicity of pins arranged in spaced, parallel, circumferential rows, said pins also being alignable in an axial direction, an electrical control circuit, a control element mounted adjacent said drum and in said circuit for each of said circumferential rows and actuated by the pins therein, one circumferential row of pins and its associated control element constituting stepping means for controlling step-by-step rotation of said drum, drive means for rotating said drum and including a continuously running electric motor in said circuit and also including an electrically operated brake and clutch in said circuit and driven by said motor, said brake and clutch being alternately operable to stop and start rotation of said drum, a settable interval timer in said circuit for determining the length of time during which said stepping means control element is operative to stop drum rotation, and a manually settable selector switch in said circuit for selecting the other control elements to be placed in the circuit for actuation by their respective pins when the latter are in axial alignment with a pin in said one circumferential row.

9. A device as defined in claim 8 further characterized in that said pins have front and rear surfaces extending radially above said drum of such shape that adjacently positioned pins in a circumferential row define a groove between them, said one control element having a probe adapted to drop into said groove to actuate said element.

10. In a program controller, a rotatable drum having a plurality of spaced, parallel, circumferential rows of perforations concentric with the axis of rotation of the drum, said perforations also being in axial alignment in respect to the axis of said drum to define transverse rows of perforations; a control switch for each of said circumferential rows and provided with a movable arm normally biased toward said drum, the arms of some of said switches being provided with a roller and the arm of at least one of said switches being provided with a narrow probe, and a plurality of pins adapted to be inserted in said perforations and over which said rollers and probe ride as the drum is rotated, said pins having adjacent sides which define a groove between adjacent pins, said rollers adapted to pass smoothly over said pins and the grooves formed therebetween and said probe being adapted to drop into said grooves as it passes over its associated pins.

11. In a program controller, a rotatable drum having a plurality of spaced, parallel, circumferential rows of perforations concentric with the axis of rotation of the drum, said perforations also being in axial alignment in respect to the axis of said drum to define transverse rows of perforations; a control switch for each of said circumferential rows and provided with a movable arm normally biased toward said drum, the arms of some of said switches being provided with a roller and the arm of at least one of said switches being provided with a narrow probe, and a plurality of pins adapted to be inserted in said perforations and over which said rollers and probe ride as the drum is rotated, said pins each having an inclined front and rear side to thereby define a groove with its adjacent pins, said pins being generally square in section as viewed in plan and adapted to bear firmly against one another when located in adjacent perforations, said rollers adapted to pass smoothly over said pins and the grooves formed therebetween and said probe being adapted to drop into said grooves as it passes over its associated pins.

12. A program controller comprising, a rotatable drum having a plurality of spaced, parallel, circumferential rows of perforations concentric with the axis of rotation of the drum, said perforations also being in axial alignment in respect to the axis of drum rotation, a control element for each of said circumferential rows, a plurality of pins inserted in selected ones of said perforations for actuating said control elements, an interval timer for determining the length of time represented by each pin, a drive means for rotating said drum and being alternately operable to stop and start rotation of said drum, and a stepping means for starting said interval timer and simultaneously stopping said drive means responsive to engagement of at least one said control element by the corresponding pin and for starting said drive means responsive to said interval timer having run for a predetermined time interval, whereby step-by-step drum rotation follows from turning the drum until the drive means have stopped and then holding the drum at the stopped position until the interval timer has operated, and then repeating the turning and holding, all in accordance with the pins.

References Cited in the file of this patent

UNITED STATES PATENTS

| | | | |
|---|---|---|---|
| 1,801,129 | Warren | Apr. 14, | 1931 |
| 2,212,868 | Strong | Aug. 27, | 1940 |
| 2,214,534 | Maxwell | Sept. 10 | 1940 |
| 2,338,305 | Simmon | Jan. 4, | 1944 |
| 2,580,787 | Johnson | Jan. 1, | 1952 |
| 2,789,165 | Nichols | Apr. 16, | 1957 |
| 2,917,591 | Juhas | Dec. 15, | 1959 |
| 2,920,152 | Werner | Jan. 5, | 1960 |